US006801283B2

(12) United States Patent
Koyama et al.

(10) Patent No.: US 6,801,283 B2
(45) Date of Patent: Oct. 5, 2004

(54) LIQUID CRYSTAL DISPLAY DEVICE

(75) Inventors: Hitoshi Koyama, Kikuchi-gun (JP); Tetsuyuki Kurata, Tokyo (JP); Tetsuya Satake, Tokyo (JP); Takahiro Nishioka, Tokyo (JP)

(73) Assignees: Advanced Display Inc., Kikuchi-gun (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/427,954

(22) Filed: May 2, 2003

(65) Prior Publication Data

US 2003/0210365 A1 Nov. 13, 2003

(30) Foreign Application Priority Data

May 10, 2002  (JP) ........................................ 2002-136311

(51) Int. Cl.[7] ............................................ G02F 1/1335
(52) U.S. Cl. ....................... 349/119; 349/180; 349/121
(58) Field of Search ................................ 349/117, 119, 349/121, 180

(56) References Cited

U.S. PATENT DOCUMENTS

| | | | | |
|---|---|---|---|---|
| 5,361,151 A | * | 11/1994 | Sonehara et al. | 349/98 |
| 6,091,477 A | * | 7/2000 | Kwok et al. | 349/180 |
| 6,480,251 B1 | * | 11/2002 | Yamaguchi et al. | 349/119 |
| 6,567,149 B1 | * | 5/2003 | Yamaguchi et al. | 349/181 |
| 6,654,093 B1 | * | 11/2003 | Kim | 349/179 |

FOREIGN PATENT DOCUMENTS

| | | |
|---|---|---|
| JP | 11-311784 | 11/1999 |
| JP | 2000-187220 | 7/2000 |

OTHER PUBLICATIONS

S. Stallinga, et al., Journal of Applied Physics, vol. 86, No. 9, pp. 4756–4766, "Equivalent Retarder Approch To Reflective Liquid Crystal Displays", Nov. 1, 1999.
M. Born, et al., Principles of Optics, 9th ed., Chap. 1, pp. 50–52, "Fundamental Properties of Electromagnetic Filed", 1998 (with English translation).
T. Toyooka, et al., Liquid Crystal, vol. 4, No. 2, pp. 159–164, "Application of Crystalline Polymer Film To Display Device", 2000 (with English translation).

* cited by examiner

*Primary Examiner*—Kenneth Parker
(74) *Attorney, Agent, or Firm*—Oblon, Spivak, McClelland, Maier & Neustadt, P.C.

(57) ABSTRACT

A liquid crystal display device has an elliptic polarizer consisting of a polarizer, a first retarder, and a second retarder, and a reflector reflecting light in a visual light range. Optimal values for a twist angle of a liquid crystal layer, an angle between a transmission axis of the polarizer and a slow axis of the first retarder, an angle between the slow axis of the first retarder and a slow axis of the second retarder, and a product of birefringence Δn of liquid crystal material used in the liquid crystal layer and a thickness d of the liquid crystal layer are evaluated.

18 Claims, 12 Drawing Sheets

LIQUID CRYSTAL DISPLAY DEVICE

BACKGROUND OF THE INVENTION

1. Field of the Invention

The present invention relates to a liquid crystal display device having a reflective liquid crystal display element, such as a reflective liquid crystal display device and a transflective liquid crystal display device including a reflective liquid crystal display element and a transmissive liquid crystal display element.

2. Description of Related Art

Being thin, lightweight, and low power consumption, a liquid crystal display device is widely used as a portable device display. Since the liquid crystal display device is not a light emitting element, it requires an external light source. Depending on the type of the external light source, the liquid crystal display device is divided roughly into two categories: transmissive-type and reflective-type.

A transmissive liquid crystal display device has a backlight using an light emitting element such as a cold-cathode fluorescent lamp and LED mounted behind the device, that is, the opposite to the side of an observer. The light from the backlight is modulated by a liquid crystal panel, thereby displaying images. On the other hand, a reflective liquid crystal display device uses a light source on the observer's side such as sunlight as the external light source. The light is reflected by a reflector mounted opposite to the observer, and the reflected light coming back to the observer's side is modulated by a liquid crystal panel, thereby displaying images.

However, the transmissive type has the problem of dim display in bright ambient light, and the reflective type has the problem of dark display in low ambient light. As a solution to the above problem, a "transflective" liquid crystal display device having display areas of both reflective-type and transmissive-type in one pixel area has been proposed. The transflective liquid crystal display device is described in Japanese Patent Application Laid-Open No. 2000-187220, for example. The transflective liquid crystal display device serves as a reflective-type with backlight off in bright ambient light to provide brighter images and reduce power consumption, while serves as a transmissive-type with the backlight on in low ambient light to provide brighter and higher-quality images. Therefore, the transflective liquid crystal display device is widely used as a cellular phone display.

FIG. 1 shows a configuration example of the transflective liquid crystal display device described in Japanese Patent Application Laid-Open No. 2000-187220. As shown in FIG. 1, the transflective liquid crystal display device has a circular polarizer 11 and a substrate 21a above liquid crystal layers 22 and 23. The circular polarizer 11 is a composite structures consisting of a polarizer 1, a retarder 2, and a retarder 3. The retarder 3 produces approximately half the retardation of the retarder 2. The substrate 21a has a transparent electrode to apply a voltage to the liquid crystal layers.

The liquid crystal layers 22 and 23 are sandwiched between substrates 21a and 21b, having different retardations. A reflective section further has a reflector 31 reflecting light in a visible light range. Between the reflector 31 and the substrate 21b is an organic layer. A transmissive section, on the other hand, has a transparent electrode to applying a voltage to the liquid crystal layer on the substrate 21b.

Below the liquid crystal layers 22 and 23 are provided the substrate 21b and a circular polarizer 12. The circular polarizer 12 is a composite structure consisting of a polarizer 4, a retarder 5, and a retarder 6. The retarder 6 produces approximately half the retardation of the retarder 5.

As described above, the transflective liquid crystal display device has a reflective liquid crystal display element in the reflective section, and a transmissive liquid crystal display element in the transmissive section, both in one pixel area. The reflective liquid crystal display element is configured in the order of the circular polarizer 11 (polarizer 1, retarder 2, and retarder 3), substrate 21a, liquid crystal layer 22, reflector 31, and substrate 21b, or in the order of the circular polarizer 11 (polarizer 1, retarder 2, and retarder 3), substrate 21a, liquid crystal layer 22, substrate 21b, and reflector 31. On the other hand, the transmissive liquid crystal element is configured in the order of the circular polarizer 11 (polarizer 1, retarder 2, retarder 3), substrate 21a, liquid crystal layer 23, substrate 21b, and circular polarizer 12 (retarder 6, retarder 5, and retarder 4).

When the angle between a transmission axis of the polarizer 1 and a slow axis of the retarder 2 is $\theta 1$, the angle between the slow axis of the retarder 2 and a slow axis of the retarder 3 is $\theta 1+45$ degrees. Further, when the retarder 2 produces approximately half wavelength of retardation, and the retarder 3 does approximately quarter wavelength of retardation, the composite of the polarizer 1, retarder 2, and retarder 3 serves as the circular polarizer 11 for the subject wavelength. The subject wavelength is generally 550 nm. The retarder producing half wavelength of retardation is called a half wave retarder, and the retarder producing quarter wavelength of retardation, a quarter wave retarder. Similarly, the composite of the polarizer 4, retarder 5, and the retarder 6 serves as the circular polarizer 12. The multilayer circular polarizers 11 and 12 composed of the half wave retarder and quarter wave retarder are especially called wide-band circular polarizers since circularly polarized light can be obtained in a wide wavelength range.

A coordinate system will be explained hereinbelow with reference to FIG. 2 to clarify the directions of the polarizer and retarder. The following descriptions use a right-handed coordinate system where the direction from the backlight toward the polarizer 1 is the positive direction of z-axis. When a transmission axis of the polarizer 1 is $\alpha 1$, a slow axis of the retarder 2 is $\alpha 2$, and a slow axis of the retarder 3 is $\alpha 3$, the axis of the polarizer, half wave retarder, and quarter wave retarder constituting the wide-band circular polarizer have the relation: $\theta 1=(\alpha 2-\alpha 1)$ and $(\alpha 3-\alpha 2)=(\theta 1+45$ degrees).

FIG. 3 schematically illustrates display principle of a transflective liquid crystal display device using a circular polarizer. First, a white display with high reflectivity and transmissivity will be explained. In the reflective section, the liquid crystal layer 22 has such a thickness as to produce quarter wavelength of retardation. In this configuration, as the circularly polarized light having passed through the circular polarizer 11 enters the liquid crystal layer 22, it is converted to linearly polarized light just before the reflector 31. After reflected by the reflector 31, the light returns, passing through the liquid crystal layer 22 again, changing into the circularly polarized light having a different chirality. Therefore, the reflected light can pass through the circular polarizer 11, achieving a bright white display.

In the transmissive section, on the other hand, the liquid crystal layer 23 has such a thickness as to produce half wavelength of effective retardation. In this configuration, as the circularly polarized light having passed through the circular polarizer 12 enters the liquid crystal layer 23, it is converted to the circularly polarized light having a different chirality just before the substrate 21a. Therefore, the light having passed through the liquid crystal layer can pass through the circular polarizer 11, achieving a bright white display.

If a voltage is applied to the liquid crystal layer, liquid crystal molecules stand up, reducing effective retardation of the liquid crystal layer. For simplifying the principle explanation, the effective retardation of the liquid crystal layer is assumed to be 0 when a sufficiently high voltage is applied to the reflective section and the transmissive section. Then, in the reflective section, the circularly polarized light having passed though the circular polarizer 11 enters the liquid crystal layer 22, and it is reflected without any change; therefore, the reflected light cannot pass though the circular polarizer 11, making a black display. In the transmissive section, similarly, the circularly polarized light having passed though the circular polarizer 12 enters the liquid crystal layer 23 to simply pass it through without any change; therefore, the light cannot pass through the circular polarizer 11, making a black display.

As explained in the foregoing, separate setting of the retardations of the liquid crystal layers in the reflective section and the transmissive section allows the both sections to operate in a normally white mode. Also, application of a voltage enables the reflective and transmissive sections to provide a black display; thereby achieving high contrast (luminance ratio) images. Retardations of the liquid crystal layers in the reflective and transmissive sections are adjusted generally by way of adjusting the thickness of the liquid crystal layers in the reflective and transmissive sections.

In the case of using reflected light for an image display, if the reflector 31 has a flat surface, the reflected light at the surface of the display device which is the upper surface of the polarizer 1 in FIG. 1 is overlapped with the reflected light having passed through the liquid crystal layer. It significantly decreases display quality, causing such a problem that black does not appear real black due to the surface reflected light. For the above reason, the reflector is formed to have an uneven surface to scatter light. Generally, the organic layer under the reflector has an uneven surface to make the reflector surface uneven. By adjusting the thickness of the organic layer, the thickness of the liquid crystal layers in the reflective and transmissive sections are adjusted accordingly.

Although it is possible to provide a member such as a scattering adhesive layer to scatter light, on the outer side of the substrates 21a and 21b, it causes problems of blur display and color mixture because the substrates 21a and 21b are as thick as 500 to 700 μm. Therefore, the reflector having a scattering function is generally provided between the substrates. For the same reason, it is also undesirable to provide the reflector 31 outside of the substrate 21b.

Obtaining high contrast images requires sufficient darkness in a black display. Since human visibility is at its highest for the light having 550 nm wavelength, the subject wavelength is generally 550 nm, and various parameters are set to produce low reflectivity and low transmissivity at the 550 nm wavelength in a black display. Therefore, the present specification uses the wavelength of 550 nm for the value of optical property including retardation. The use of the wideband circular polarizer allows reduction of reflectivity and transmissivity not only for the wavelength of 550 nm but also for the wavelength close thereto, reducing luminosity of the black display and producing high contrast images.

The liquid crystal layer generally has the twist alignment where a twist angle which is the angle difference in alignment directions of liquid crystal molecules at the interfaces of the both substrates is approximately 60 to 75 degrees, for the following reason. If the twist angle is 70 degrees, there is a gap range where a change in the thickness of the liquid crystal layer, which is called a "gap" because it corresponds to the gap width between the substrates, does not affect effective retardation of the liquid crystal layer in the reflective section (S. Stallinga "J. Appl. Phys.": Vol.86, p.4756, 1999). Within the gap range, the reflectivity does not change relative to the gap width, allowing a wide process margin relative to the gap.

FIG. 4 shows an evaluation result of the dependence of luminance reflectivity of a white display in the reflective section at the twist angle of 70 degrees, on the product $\Delta$nd of the birefringence $\Delta$n of liquid crystal material of the liquid crystal layer 22 in the reflective section and the liquid crystal layer thickness (gap) d. In the graph of FIG. 4, the vertical axis is the luminance reflectivity and the horizontal axis is $\Delta$nd. The luminance reflectivity is the amount that the luminance of reflected light is standardized by the luminance of a light source. The graph in FIG. 4 indicates that if $\Delta$nd of the liquid crystal layer 22 in the reflective section is approximately 240 nm and above, the reflectivity is constant at approximately 0.34.

In the transflective liquid crystal display element, the transmissive section and the reflective section generally have the same twist angle of the liquid crystal layer and the common circular polarizer 11. Though the use of multi-domain technique allows separate twist angle setting for the transmissive section and reflective section, it costs a lot and therefore the same setting is generally applied. The relation between a twist angle of the liquid crystal layer and $\Delta$nd (the product of birefringence $\Delta$n and gap d) to produce high reflectivity and transmissivity in a given twist angle on the condition that the twist angle of the liquid crystal layer are the same and the circular polarizer 11 is common in the transmissive and reflective sections is described in Japanese Patent Application Laid-Open No. 2000-187220, for example.

Although a wide-band circular polarizer consisting of a half wave retarder and a quarter wave retarder is generally used, it is also possible to simply make a circular polarizer by placing a quarter wave retarder so that its slow axis is making a 45 degree angle with respect to the transmission axis of the polarizer. Elimination of the half wave retarder results in reduction in thickness and costs. The reduction in thickness is especially a great advantage for use in portable devices. However, the half wave retarder is generally provided in spite of the disadvantages of higher thickness and costs since it achieves high contrast images. Japanese Patent Application Laid-Open No. 2000-187220 refers to another advantage of preventing display from being colored, though no data for evaluation are presented.

It is assumed in the above principle explanation that effective retardation of the liquid crystal layer is 0 when a sufficiently high voltage is applied to the reflective section and the transmissive section. However, since the voltage is finite in practice, the effective retardation of the liquid crystal layer never becomes 0. Therefore, when using a circular polarizer having a composite structure consisting of a half wave retarder and quarter wave retarder, an actual driving voltage of 5V or below does not provide sufficient darkness in a black display, thus reducing contrast.

Japanese Patent Application Laid-Open No. H11-311784 describes that the above problem can be solved by setting the slow axis of the retarder 3 parallel to a bisector of alignment directions of liquid crystal material at substrate interfaces, and producing less than quarter wavelength of retardation. However, the above prior art does not specify a display color.

In a reflective liquid crystal element using the circular polarizer, if Δnd of the liquid crystal layer in the reflective section is in the range of high reflectivity, a white display in the reflective section turns yellow, even when the half wave retarder is used, the slow axis of the retarder 3 is parallel to the bisector of alignment directions of liquid crystal material at substrate interfaces, and retardation is less than quarter wavelength. It is noted that the circular polarizer is an elliptic polarizer to be exact since the quarter wave retarder does not produce exactly quarter wavelength of retardation. In the following, the unit referred to as a circular polarizer can be an elliptic polarizer in the strict sense.

FIG. 5 shows an evaluation result of the dependence of color coordinates (the Yxy color system of CIE1931) in a white display in the reflective section on Δnd of the liquid crystal layer in the reflective section. C light source is used. The retarder 3 produces 120 nm of retardation, its slow axis is parallel to the bisector of alignment directions of liquid crystal material at substrate interfaces, and its twist angle is 70 degrees. In the high reflectivity range where Δnd of the liquid crystal layer in the reflective section is approximately 250 nm and above, x>0.32 and y>0.33. A measure of the range where color is substantially invisible is 0.285<x<0.32 and 0.3<y<0.325, and it is actually yellow compared to white (the C light source, (x, y)=(0.310, 0.316)).

The color of the reflective section depends on the color of the light source. The C light source (correlated color temperature 6774K) used is equivalent to "daylight in a blue sky". Normal fluorescent light (interior light) has the same or less color temperature. Therefore, when it appears yellow with the C light source, it appears the same under normal use conditions, which is of a problem.

Since the problem that a white display in the reflective section turns yellow occurs under the conditions in the reflective section only, the same problem occurs in a reflective liquid crystal display device using the reflective display element only, and a transflective liquid crystal display device.

SUMMARY OF THE INVENTION

The present invention has been accomplished to solve the above problems and an object of the present invention is thus to provide a liquid crystal display device having a reflective liquid crystal display element presenting high quality images with high contrast and substantially white display.

A liquid crystal display device according to the present invention is a liquid crystal display device having a reflective liquid crystal display element including a set of substrates having an electrode to apply a voltage to a liquid crystal layer, a twisted liquid crystal layer interposed between the substrates, an elliptic polarizer consisting of a polarizer, a first retarder, and a second retarder having a slow axis substantially parallel to a bisector of alignment directions of liquid crystal material at substrate interfaces and producing retardation of not more than 140 nm, and a reflector reflecting light in a visible light range, wherein a product (nm) of birefringence Δn of liquid crystal material used in the liquid crystal layer and a thickness d of the liquid crystal layer is not less than 120 nm, and not more than a value given by Formula 1:

$$89.2 + \frac{1.42 \times 10^6}{[Re + (Re' - 270) \cdot \cos(2|\alpha_3 - \alpha_2|)]^2}$$

when a twist angle in the liquid crystal layer is in a range of 63 to 77 degrees, an angle between a transmission axis $\alpha_1$ of the polarizer and a slow axis $\alpha_2$ of the first retarder is in a range of 5 to 25 degrees or in a range of 95 to 115 degrees, an angle between the slow axis $\alpha_2$ of the first retarder and a slow axis $\alpha_3$ of the second retarder is in a range of 50 to 70 degrees, retardation produced by the second retarder is Re (nm), and retardation produced by the first retarder is Re' (nm).

In the above configuration, it is possible to obtain a liquid crystal display device providing high quality images with high contrast and substantially white display in the reflective section.

The twist angle in the liquid crystal layer is preferably in a range of 65 to 75 degrees. Also, it is preferable that the angle between the transmission axis $\alpha_1$ of the polarizer and the slow axis $\alpha_2$ of the first retarder is in a range of 10 to 20 degrees or in a range of 100 to 110 degrees.

The angle between the slow axis $\alpha_2$ of the first retarder and the slow axis $\alpha_3$ of the second retarder is preferably in a range of 55 to 65 degrees. Further, the product of birefringence Δn of liquid crystal material used in the liquid crystal layer and a thickness d of the liquid crystal layer is preferably not less than 130 nm.

It is further preferable that the liquid crystal display device has a transmissive liquid crystal display element including a second elliptic polarizer consisting of a second polarizer, a third retarder, and a fourth retarder, and a second twisted liquid crystal layer interposed between the substrates, and that a slow axis of the fourth retarder is inclined with respect to the bisector of alignment directions of liquid crystal material at substrate interfaces at −15 to +15 degrees, and retardation produced by the fourth retarder is 80 nm to 140 nm. The above configuration allows a liquid crystal display device providing high quality images with high contrast and substantially white display in the reflective section.

The slow axis of the fourth retarder is preferably inclined with respect to the bisector of alignment directions of liquid crystal material at substrate interfaces at −10 to +10 degrees.

It is preferable that an angle between a transmission axis of the second polarizer and a slow axis of the third retarder is in a range of 63 to 70 degrees or in a range of 153 to 160 degrees, and an angle between the slow axis of the third retarder and a slow axis of the fourth retarder is in a range of 108 to 115 degrees. The above configuration allows a liquid crystal display device providing high quality images with high luminosity (transmissivity) in a black display in the transmissive section. The fourth retarder is preferably a hybrid alignment liquid crystal display film.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 5:
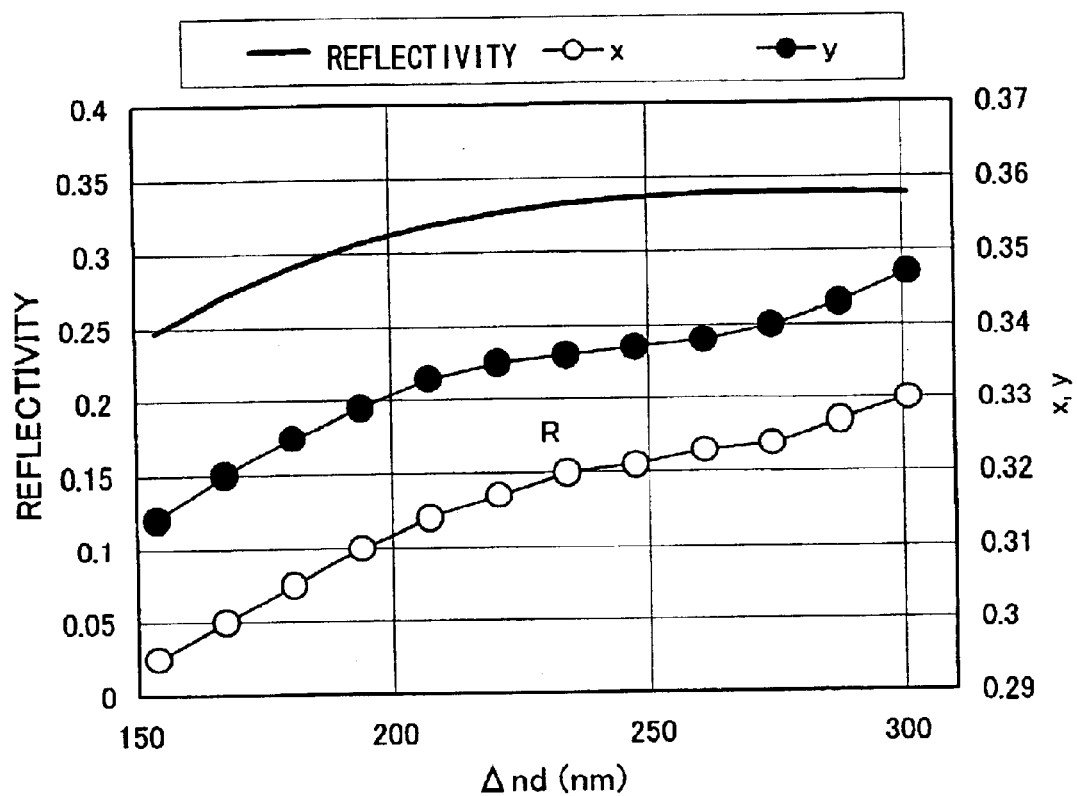
FIG. 5 is a view showing an evaluation result of a dependence of color coordinates in a white display in the reflective section on Δnd of the liquid crystal layer.

With respect to the problem that white displayed in the reflective section turns yellow, the graph in FIG. 5 indicates that reduction of Δnd in the reflective section allows whiter display. Therefore, the maximum value of Δnd where a display is substantially white (the range of 0.285<x<0.32 and 0.3<y<0.325), when the retarder 3 has the slow axis parallel to the bisector of alignment directions of liquid crystal material at substrate interfaces, and produces the retardation Re less than quarter wavelength, is evaluated for the retardation Re of 100 nm, 120 nm, and 140 nm, as disclosed in Japanese Patent Application Laid-Open No. H11-311784. For example, the value for the retardation Re of 120 nm can be evaluated from the graph shown in FIG. 5. The value of Δnd should be less than approximately 240 nm to obtain x of less than 0.32 where a display is substantially white. Also, the retardation Re should be less than approximately 190 nm to obtain y of less than 0.325 where a display is substantially white. The result shows that Δnd should be less than approximately 190 nm for x and y to fall in the range where a display is substantially white. The maximum value of Δnd where a display is substantially white is evaluated in the same manner for the retardation Re of 100 nm and 140 nm.

Figure 6:
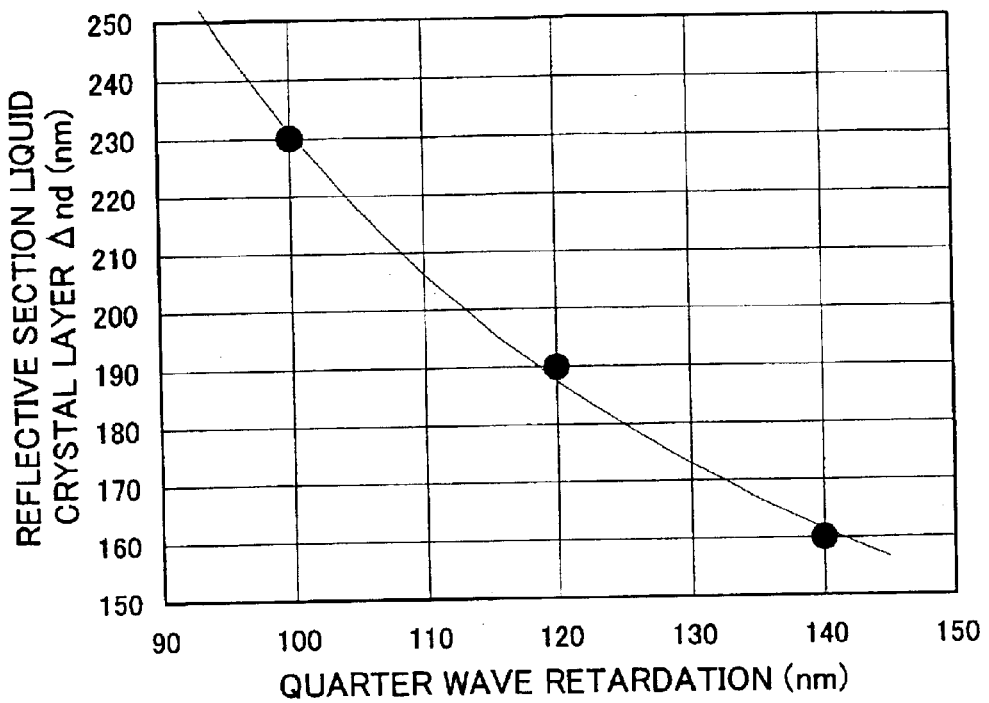
FIG. 6 is a view showing an evaluation result of a dependence of the maximum value of Δnd of the liquid crystal layer where a display is substantially white in the reflective section on retardation of the retarder 3.

FIG. 6 shows the maximum values of Δnd where a display is substantially white, which have been evaluated as above. The circled black points in the graph indicate the evaluated value of Δnd with respect to the retardation Re of 100 nm, 120 nm, and 140 nm. Fitting the values with the formula $(A+B/Re^2)$ results in the following formula 2, which is shown in full line in FIG. 6. The unit of Δnd and the retardation Re of the retarder 3 is nm. The problem can be solved by setting the value of Δnd of the liquid crystal layer in the reflective section to be smaller than the value given by the formula 2.

$$89.2 + \frac{1.42 \times 10^6}{Re^2} \qquad \text{[Formula 2]}$$

The reason will be explained hereinafter.

Figure 7:
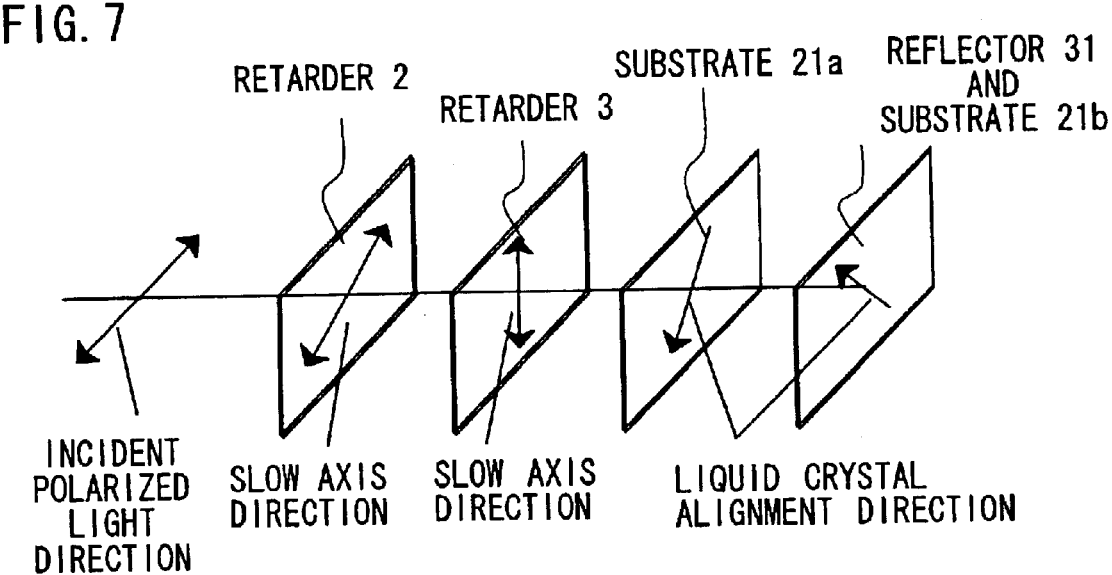
FIG. 7 is a view schematically showing arrangement of optical elements used in the evaluation shown in FIG. 8.
Figure 8:
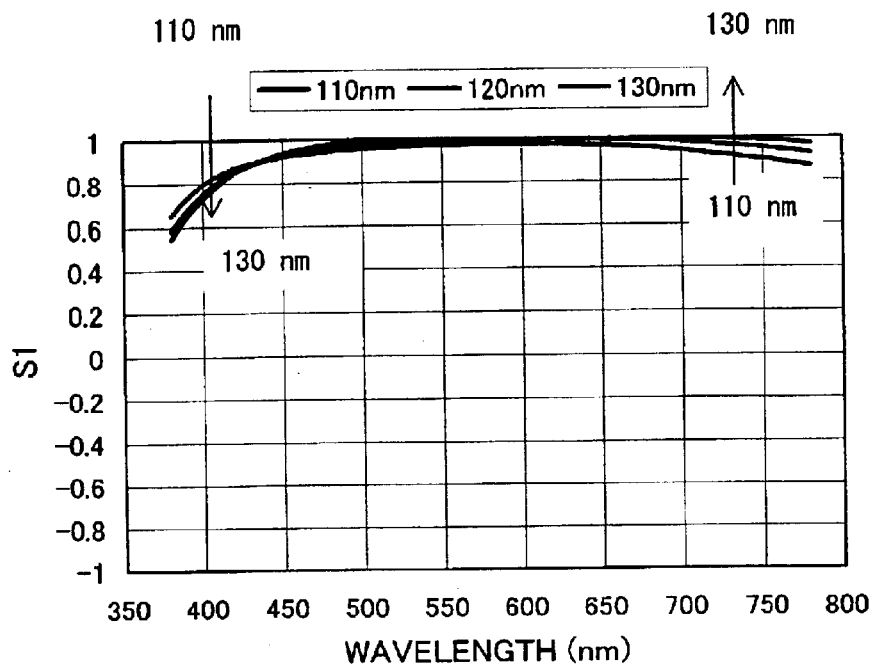
FIG. 8 is a view showing a Stokes parameter evaluation result of reflected light in the arrangement of optical elements shown in FIG. 7.

As described above, the reflective section with the alignment status twisted approximately 70 degrees operates in normally white mode. Therefore, in order to obtain high reflectivity, the voltage applied should be less than the threshold voltage which moves liquid crystal molecules when displaying white. In the transflective liquid crystal display device as well, the equal voltage is applied in order to obtain high transmissivity in the transmissive section. FIG. 8 shows an evaluation result of polarization status of the reflected (emitted) light when linearly polarized light enters the reflective section without the polarizer 1 displaying white, the arrangement of which is shown in FIG. 7. The retarders 2 and 3 are provided. In the graph of FIG. 8, the horizontal axis is wavelength, and the vertical axis is Stokes parameter S1 standardized by reflected light intensity. The incident polarized light is linearly polarized light of S1=1. The Stokes parameter is detailed in M. Born and E. Wolf, translation by Toru Kusakawa and Hidetsugu Yokota, Principles of Optics, 9th ed., 1998, Chap. 1, p.50.

As shown in FIG. 8, the retardation of the retarder 3 is varied from 110 nm to 130 nm, and the reflected (emitted) polarized light is S1=1 having the same polarization status as the incident polarized light over the wide range of visible light region. Therefore, if the polarizer 1 is mounted to let the emitted polarized light through, the reflected light passes through the polarizer 1 in the wide range of the visible region, presenting bright white display. It is thereby indicated that the retarder 3 and a part of the liquid crystal layer 22 substantially serve as a quarter wave retarder constituting a wide-band circular polarizer.

Figure 9:
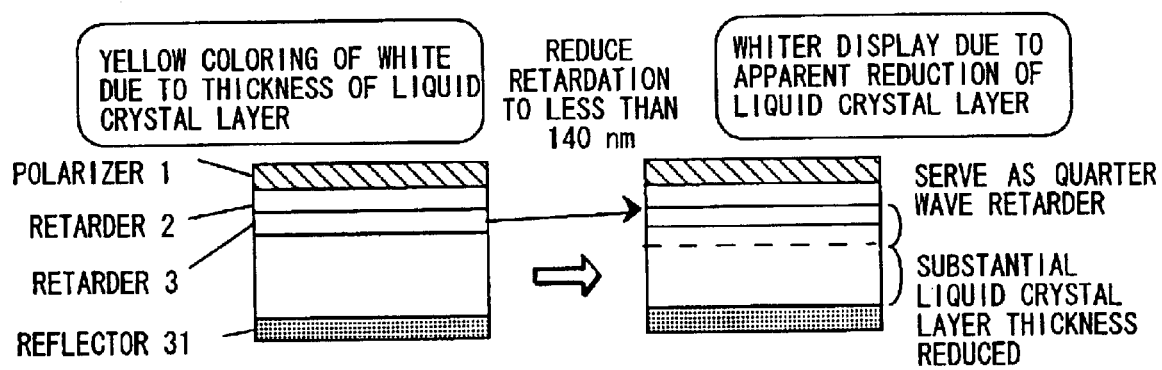
FIG. 9 is a view to explain a solution to the problem that a white display in the reflective section turns yellow, according to the present invention.

The status that a part of the liquid crystal layer 22 serves as the quarter wave retarder means the thickness of the liquid crystal layer contributing to its original function of modulating reflected (emitted) light intensity is substantially reduced. Accordingly, Δnd of the liquid crystal layer contributing to the modulation is decreased; allowing a white display in the reflective section to near real white. FIG. 9 schematically illustrates the condition. Δnd of the liquid crystal layer 22 in the reflective section should be less than the value given by Formula 2 for a whiter display. In reducing Δnd, since it is difficult to reduce Δn, the thickness d of the liquid crystal layer should be reduced. However, there is a limit in reducing the thickness of the liquid crystal layer. If a part of the liquid crystal layer 22 serves as a quarter wave retarder, it allows a white display in the reflective section to near real white, while having the thickness of the liquid crystal layer easy to manufacture.

For the retarder 3 and a part of the liquid crystal layer to serve as a retarder having quarter retardation of the wideband circular polarizer, the slow axis of the retarder 3 is not necessarily exactly parallel to the bisector of alignment directions of liquid crystal material at substrate interfaces, but can be inclined up to ±15 degrees or preferably ±10 degrees with respect to the bisector.

The slow axis of the retarder 3 is fixed with respect to the liquid crystal layer. In order to serve as the wide-band circular polarizer, when the angle between the transmission axis α1 of the polarizer 1 and the slow axis α2 of the retarder 2 is θ1=α2−α1, the angle between the slow axis α2 of the retarder 2 and the slow axis α3 of the retarder 3 should be α3−α2=θ1+45 degrees. For the above reasons, the directions of the polarizer 1 and the retarder 2 are determined by the parameter θ1.

Figure 10:
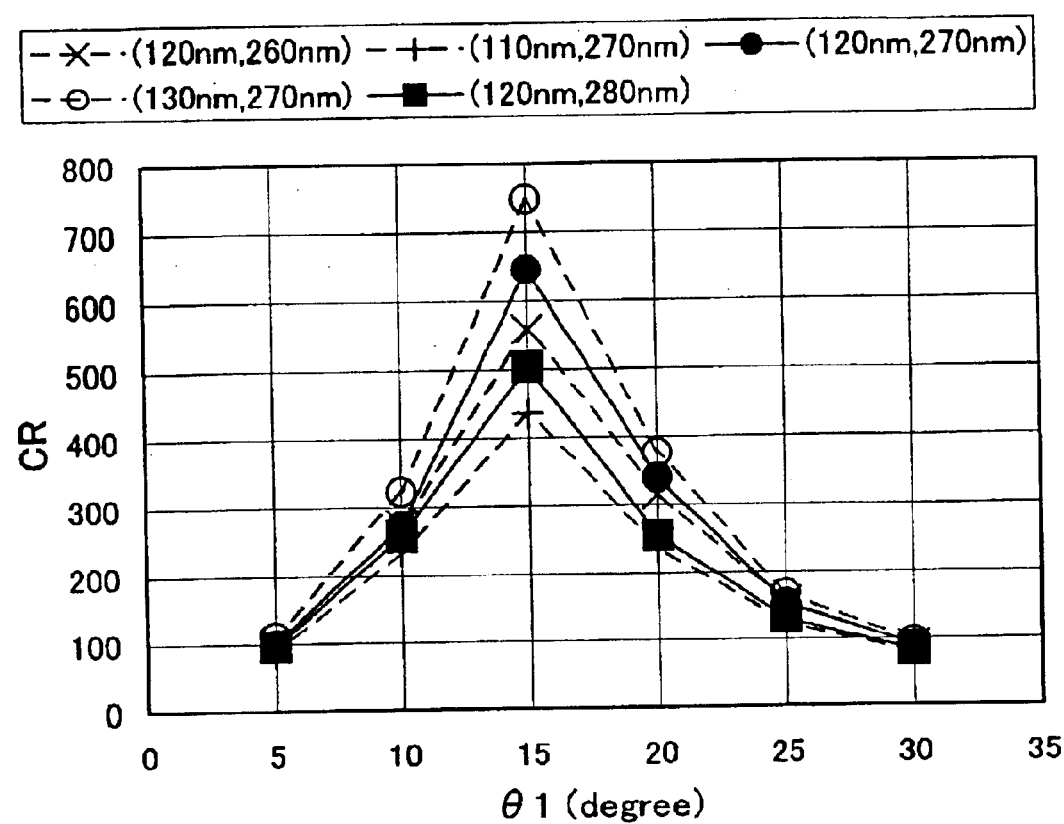
FIG. 10 is a view showing an evaluation result of a dependence of a contrast in the reflective section on an angle θ1 between a transmission axis of the polarizer 1 and a slow axis of the retarder 2.

FIG. 10 shows an evaluation result of the dependence of a contrast on θ1 when Δnd of the reflective section liquid crystal layer 22 having twist angle at −70 degrees ("−" indicates left handed twist) is 167 nm. In FIG. 10, Q and H of the explanatory notes (Q, H) are the retardations of the retarder 3 and the retarder 2, respectively. In any combinations of the retardation, the contrast is at its maximum value when θ1=15 degrees, which is, the angle between the transmission axis of the polarizer 1 and the slow axis of the retarder 2 is 15 degrees, and the slow axis of the retarder 2 and the slow axis of the retarder 3 is 15 degrees+45 degrees=60 degrees.

The contrast in the reflective section is likely to be smaller than the contrast in the liquid crystal layer alone due to scattering of light at a display device surface. If a calculated value of the contrast in the liquid crystal layer alone is more than 100, it is easy for an actual display device to have the contrast of more than 20; therefore, θ1 can be 15±10 degrees or preferably 15±5 degrees. Also, the angle between the slow axis α2 of the retarder 2 and the slow axis α3 of the retarder 3 can be 60±10 degrees or preferably 60±5 degrees.

It is also possible to rotate the transmission axis of the polarizer at 90 degrees to make the angle between the transmission axis of the polarizer 1 and the slow axis of the retarder 2 approximately 105 degrees, and the angle between the slow axis of the retarder 2 and the slow axis of the retarder 3 approximately 60 degrees. Also, it is possible that α1−α2=approximately 15 degrees, and α2−α3= approximately 60 degrees. In this case, the transmission polarization status when light enters from the polarizer side of the circular polarizer (or elliptic polarizer exactly) is simply replaced with the one orthogonal to the original transmission polarization status. It is feasible that α1−α2= approximately 105 degrees, and α2−α3=approximately 60 degrees.

Figure 11:
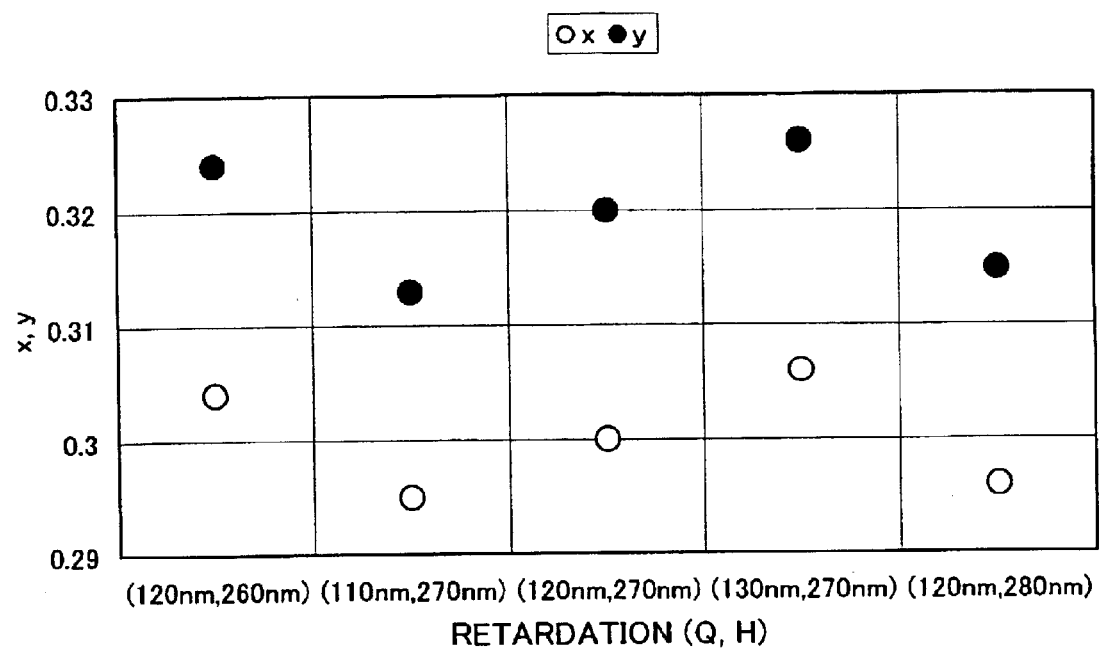
FIG. 11 is a view showing an evaluation result of a dependence of color coordinates in a white display in the reflective section on retardation of the retarders 2 and 3.

FIG. 11 shows an evaluation result of color coordinates of a white display at θ=15 degrees. C light source is used. In any combination of retardations, x and y fall in the range of approximately 0.285<x<0.32 and 0.3<y<0.325, respectively, thus appearing white.

In the above explanations, the retardation of the retarder 2 is 270 nm, approximately half the subject wavelength. As the retardation of the retarder 2 changes, so does the maximum value of Δnd of the reflective section liquid crystal layer 22 where a display is substantially white.

The maximum value of Δnd of the reflective section liquid crystal layer 22 where a display is substantially white (in the range of approximately 0.285<x<0.32 and 0.3<y<0.325) is evaluated for different values of the retardation Re' of the retarder 2. Then, using the graph of FIG. 6, the variation of Re' is converted to the variation of Re of the retarder 3 when Re'=270 nm where the same value of Δnd is given. The result is that the variation of Re' is about half the variation of Re, as shown in Table 1.

TABLE 1

| Re' of retarder 2 | Δnd of liquid crystal layer 22 | Re of retarder 3, when Re' = 270 nm, to produce the same Δnd |
| --- | --- | --- |
| 270 nm | 186 nm | 120 nm |
| 280 nm | 195 nm | 115 nm |
| 290 nm | 210 nm | 108 nm |

In Table 1, the retardation value Re of the retarder 3 is fixed at 120 nm. The retardation value Re' of the retarder 2 is set to 280 nm and 290 nm. Then, in the above evaluation method using FIG. 6, the maximum value of the retardation value Δnd in the liquid crystal layer where a display is substantially white is evaluated for each value of Re'. The result is Δnd of 195 nm for the retardation Re' of 280 nm, and 210 nm for 290 nm. Further, the graph of FIG. 6 indicates that the retardation Re of the retarder 3 where a display is substantially white is 115 nm and 108 nm for Δnd of 195 nm and 210 nm, respectively. Thus, when the retardation Re' of the retarder 2 are changed to 280 nm and 290 nm from 270 nm, the retardation value Re, when the retardation Re' is 270 nm, to produce the same value of Δnd creating the same white level is 115 nm and 108 nm respectively. The variation is then converted to the variation of Re, which indicates that the variation of Re' is about half the variation of Re.

Therefore, in the case where the retardation Re' of the retarder 2 is not 270 nm, Formula 2 is replaced with the following Formula 3.

$$89.2 + \frac{1.42 \times 10^6}{\left[Re - \left(\frac{Re' - 270}{2}\right)\right]^2} \qquad \text{[Formula 3]}$$

The angle between the slow axes of the retarders 2 and 3 is not necessarily exactly 60 degrees. With the angle of more than 60 degrees, the converted variation of Re is more than half the variation of Re'. For example, if the slow axes of the retarders 2 and 3 are orthogonal to each other, the converted variation of Re is the same as the variation of Re'. From Formulas 2 and 3, a display becomes substantially white when the value of Δnd in the reflective section liquid crystal layer 22 is less than the value given by Formula 1. However, if the Δnd value in the liquid crystal layer 22 is close to the value given by Formula 1, the margin for Δnd becomes smaller. Therefore, the value is more preferably less than the value given by Formula 1 minus 5 nm.

$$89.2 + \frac{1.42 \times 10^6}{[Re + (Re' - 270) \cdot \cos(2|\alpha_3 - \alpha_2|)]^2} \qquad \text{[Formula 5]}$$

However, if the value of Δnd in the liquid crystal layer 22 is too small, the color turns blue rather than white. A gap which is a thickness d of the liquid crystal display is adjusted by placing a spacer that is spherical or columnar shape of beads formed by $SiO_2$ or resin, between the substrates.

However, the currently available mass-produced beads have the diameter of 2 µm at the smallest, which is substantially the same as the gap width limit to cause coloring. Though the use of a post spacer formed based on a resin column by photolithography technique allows smaller gap, it costs much and therefore is unfavorable for low-price small liquid crystal display devices. Also, currently available mass-produced liquid crystal materials have birefringence Δn of 0.065 at the smallest. Therefore, the smallest Δnd in the reflective section liquid crystal display layer 22 is 0.065×2 µm=130 nm.

Figure 12:
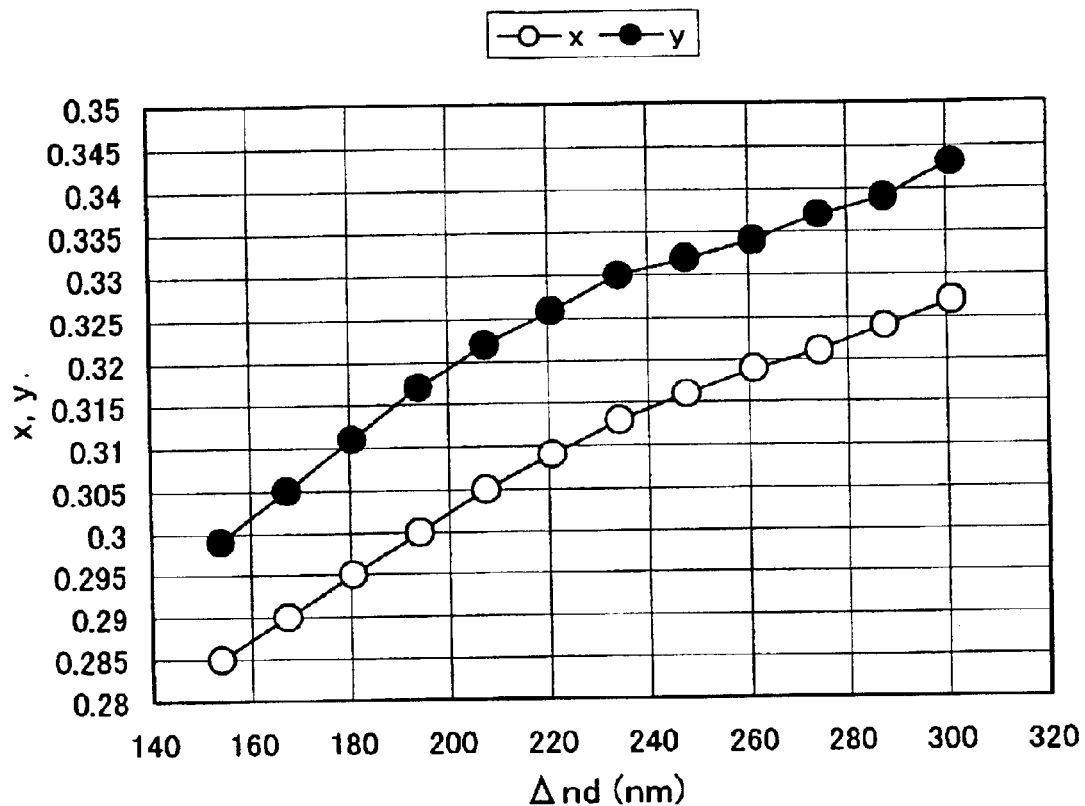
FIG. 12 is a view showing an evaluation result of a dependence of color coordinates in a white display in the reflective section on Δnd of the liquid crystal layer.

As shown in FIG. 6, the smaller the retardation value Re of the retarder 3 is, the larger the gap d in the reflective section, allowing white display to appear whiter even with a large value of Δnd. The smallest retardation of a currently available retarder is 100 nm. FIG. 12 shows an evaluation result of the dependence of color coordinates in the reflective section in a white display on Δnd when the retarder 3 produces 100 nm retardation. With Δnd value of 162.5 nm, x and y are within the range where a display is substantially white which is 0.285<x<0.32 and 0.3<y<0.325. Therefore, no problem occurs unless Δnd is extraordinarily small.

In the foregoing, the explanation has been given on the reflective section with the twist angle of approximately 70 degrees which has been used for the reason that the change in the gap of the reflective section does not cause the change in the reflectivity in a white display. Though the above condition changes if Δnd of the reflective section liquid crystal layer is less than the value given by Formula 1, it is preferable that the twist angle of the liquid crystal layer is in the range of 63 to 77 degrees in terms of a color of the white display and reflectivity as described hereinbelow.

Figure 13:
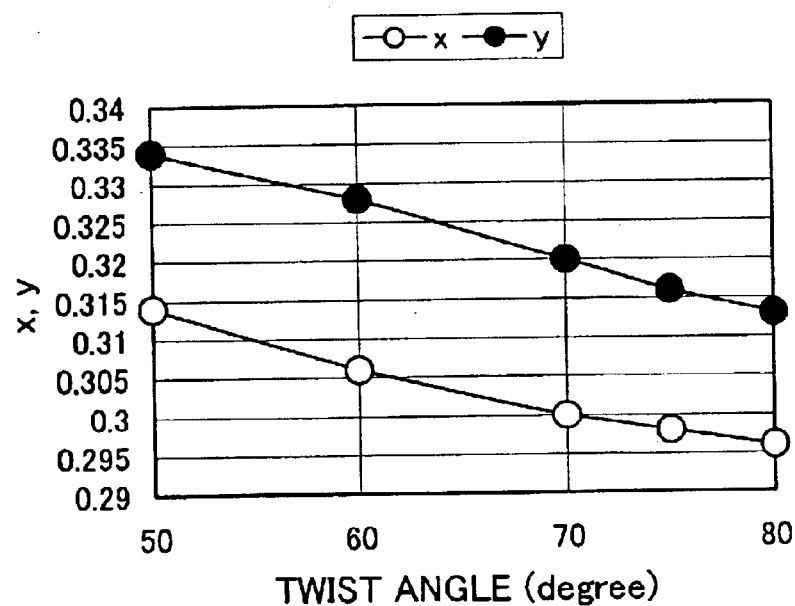
FIG. 13 is a view showing an evaluation result of a dependence of color coordinates in a white display in the reflective section on a twist angle of the liquid crystal layer.

The smaller is the twist angle of the liquid crystal layer in the reflective section, the larger becomes effective retardation of the liquid crystal layer, causing a white display in the reflective section to turn yellow. FIG. 13 shows an evaluation result of the dependence of color coordinates of the white display in the reflective section on a twist angle of the liquid crystal layer. The twist angle should be more than 63 degrees in order to fall in the range of 0.285<x<0.32 and 0.3<y<0.325 where a display is substantially white.

Figure 14:
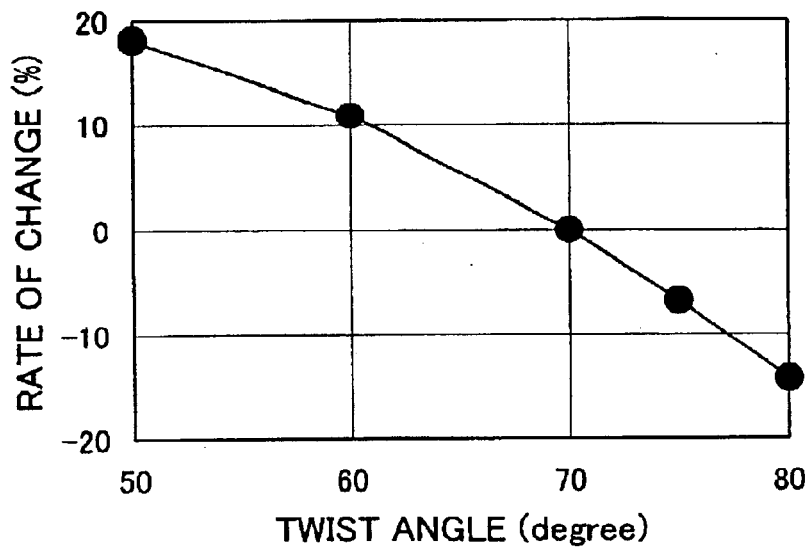
FIG. 14 is a view showing an evaluation result of a dependence of reflectivity in a white display in the reflective section on a twist angle of the liquid crystal layer.

On the other hand, the larger is the twist angle, the smaller becomes effective retardation of the liquid crystal layer, thereby creating a whiter display, while reducing reflectivity. FIG. 14 shows an evaluation result of the dependence of the reflectivity on twist angles, shown as a rate of change (%) at the twist angle 70 degrees. Since the reflectivity of a white display is preferably large within the range of not turning white into yellow, the twist angle of the reflective section liquid crystal display layer is desirably less than 77 degrees. With the twist angle of less than 77 degrees, the reduction in the reflectivity is less than 10% with respect to the twist at 70 degrees.

Therefore, the preferable twist angle in the reflective section is in the range of 63 to 77 degrees. More preferably, it is in the range of 65 to 75 degrees since the small angle causes a white display to turn yellow and the large angle causes the reflectivity to be reduced.

As explained in the foregoing, in the liquid crystal display device including a reflective liquid crystal display element with 70 degrees twist angle using a wide-band circular polarizer, high quality images with high contrast and substantially white display can be obtained in the following conditions: the product of the birefringence Δn of the liquid crystal material used for the liquid crystal layer 22 and the thickness d of the liquid crystal layer 22 being less than the value given by Formula 1, when the angle between the transmission axis α1 of the polarizer 1 and the slow axis α2 of the retarder 2 is approximately 15 or 105 degrees, and the angle between the slow axis α2 of the retarder 2 and the slow axis α3 of the retarder 3 is approximately 60 degrees, where the retardation of the retarder 3 is Re and that of the retarder 2 is Re'.

In a transflective liquid crystal display device having both a reflective liquid crystal display element and transmissive liquid crystal display element, the transmissive section and the reflective section generally have the same twist angle of the liquid crystal layer and the common circular polarizer 11 (elliptic polarizer, exactly) consisting of the polarizer 1 and the retarders 2 and 3. It is preferable for the transflective liquid crystal display device having the above configuration that the slow axis of the retarder 6 is parallel to the bisector of alignment directions of liquid crystal material at substrate interfaces, and the retardation of the retarder 6 is less than 140 nm, for the following reasons.

Figure 15:
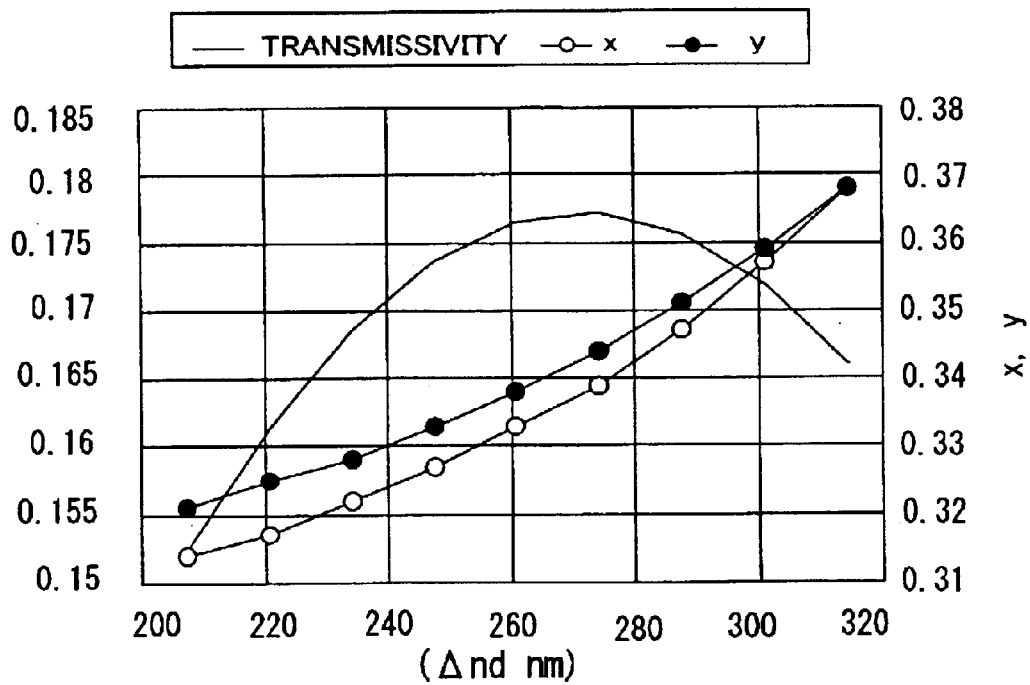
FIG. 15 is a view showing an evaluation result of a dependence of transmissivity and color coordinates in a white display in the reflective section on Δnd of the liquid crystal layer.

FIG. 15 shows an evaluation result of the dependence of the transmissivity (left hand vertical axis) and color coordinate (right hand vertical axis) in a white display in the transmissive section, on Δnd of the liquid crystal layer 23 in the transmissive section, when the circular polarizer 11 is used in the above configuration. The value of Δnd of liquid crystal layer in the transmissive section should be less than approximately 220 nm for a substantially white display. Therefore, the gap in the transmissive section should be less than 3.4 µm even when Δn is 0.065.

A gap difference in the reflective section and the transmissive section is controlled by the thickness of the organic layer under the reflector 31. Since the reflector 31 (Al, Al—CR alloy, Ag, and the like) generally doubles as an electrode, it is necessary to ensure continuity with a signal line. Therefore, a contact hole is formed by etching on the organic layer and an insulation film of the signal line. The insulation film is required to prevent short-circuit. In the etching process, the organic layer is also etched; therefore, it should have a thickness of 1.5 µm and above so as to remain for maintaining insulation. For this reason, the reflective section gap should be more than 3.4 µm (the gap difference should be more than 0.9 µm), causing yellow coloring of white to occur in the reflective section.

Figure 16:
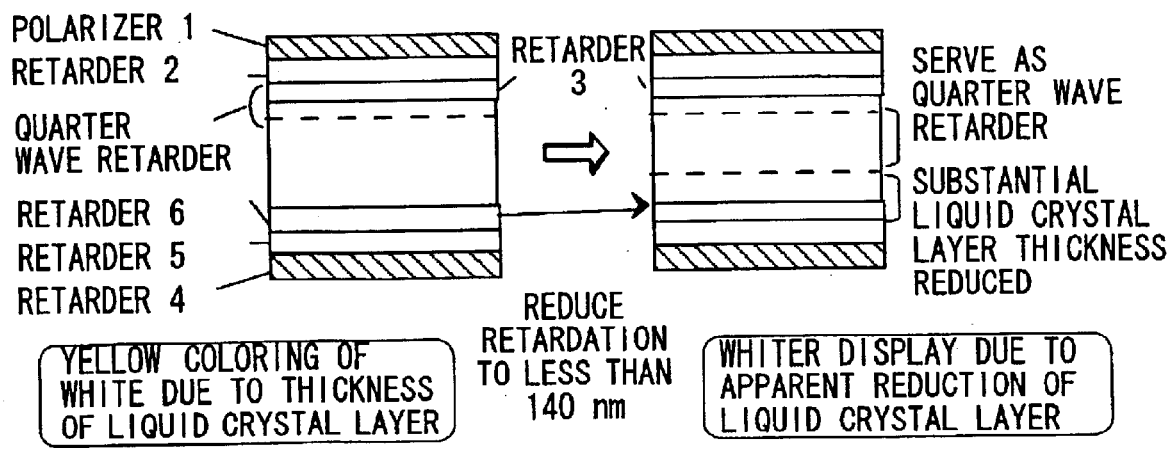
FIG. 16 is a view to explain a solution to the problem that a white display in the reflective section turns yellow, according to the present invention.

When the retarder 6 has the slow axis parallel to the bisector of alignment directions of liquid crystal material at substrate interfaces and produces the retardation of less than 140 nm, the retarder 6 and a part of the liquid crystal layer 23 serve as a quarter wave retarder of a wide-band circular polarizer, which is, as a retarder having quarter retardation of a subject wavelength (normally 550 nm). It results in that the thickness of the liquid crystal layer contributing to its original function of modulating transmission light intensity is substantially reduced. Accordingly, substantial Δnd of the liquid crystal layer 23 is decreased; therefore, a white display in the transmissive section nears real white. FIG. 16 schematically shows the mechanism.

For the retarder 6 and a part of the liquid crystal layer to serve as a retarder having quarter retardation of the wide-band circular polarizer, the slow axis of the retarder 6 is not necessarily exactly parallel to the bisector of alignment directions of liquid crystal material at substrate interfaces, but can be inclined within the range of ±15 degrees or preferably ±10 degrees with respect to the bisector.

It is possible to use a hybrid alignment liquid crystal film as the retarder 6. The hybrid alignment liquid crystal film is a film in which the alignment status of liquid crystal molecules at one substrate interface is significantly different from the status at the other substrate interface, which is, the angle between an alignment vector and a substrate surface is significantly different between at both substrate interfaces. NHfilm by Nippon Oil Corporation is one of major hybrid alignment liquid crystal films.

If rise directions of liquid crystal molecules are opposite in the transmissive section liquid crystal layer and in the hybrid alignment liquid crystal film, optical anisotropy is canceled out (compensated) to reduce tone inversion occurring in the rise direction of liquid crystal molecules in the transmissive section liquid crystal layer, allowing wider viewing angle in the transmissive section (Toyooka and Kobori, Liquid Crystal, Vol. 4, No. 2, p.159). Since the average rise direction of liquid crystal molecules in the transmissive section liquid crystal layer is the bisector direction of alignment directions of liquid crystal material at substrate interfaces, the slow axis of the hybrid alignment liquid crystal film used as the retarder 6 should be parallel to the bisector direction; thereby satisfying the above condition.

The slow axis of the retarder 6 is fixed with respect to the liquid crystal layer. In order to serve as the wide-band circular polarizer 12, when the angle between the transmission axis $\alpha 4$ of the polarizer 4 and the slow axis $\alpha 5$ of the retarder 5 is $\theta 2 = \alpha 5 - \alpha 4$, the angle between the slow axis $\alpha 5$ of the retarder 5 and the slow axis $\alpha 6$ of the retarder 6 should be $\theta 2 + 45$ degrees. For the above reasons, the directions of the polarizer 5 and the retarder 6 are determined by the parameter $\theta 2$. $\theta 2$ is preferably approximately 65 degrees for the following reasons.

When displaying black, high transmissivity causes images to appear whitish. In a liquid crystal display element, display properties change according to a viewing axis, which is called viewing angle properties. Therefore, if it is designed to create so dark black as to have certain contrast when seen from the front, the transmissivity becomes too high when the viewing axis is inclined. Even with the use of a special retarder such as the hybrid alignment liquid crystal film or a retarder using a normal transparent resin such as polycarbonate, the above problem occurs in varying degrees. Especially, if the transmissivity varies significantly when the viewing axis is inclined to the right and left, a black display appears extremely whitish in the direction with the higher transmissivity; which is of a serious problem.

Figure 17:
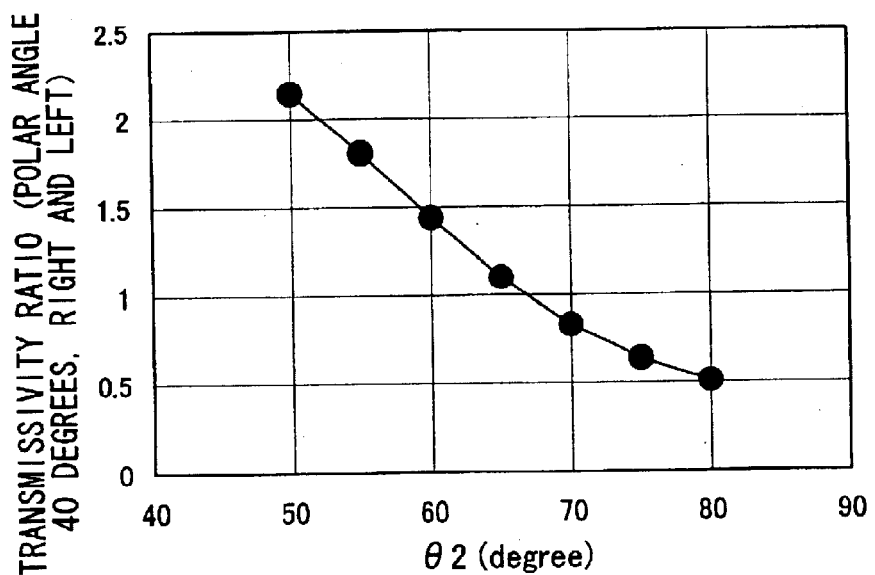
FIG. 17 is a view showing an evaluation result of a dependence of the transmissivity ratio where a viewing axis is inclined at 40 degrees to the left and at 40 degrees to the right with respect to normal when the transmissive section displays black, on an angle θ2 between a transmission axis of the polarizer 4 and a slow axis of the retarder 5.

FIG. 17 shows an evaluation result of the dependence of the transmissivity ratio when a viewing axis is inclined at 40 degrees to the left and to the right with respect to normal, on the angle $\theta 2 = \alpha 5 - 4$ which is the angle between the transmission axis $\alpha 4$ of the polarizer 4 and the slow axis $\alpha 5$ of the retarder 5. The retarder 6 is a uniaxial retarder using a normal transparent resin such as polycarbonate. The angle between the transmission axis $\alpha 1$ of the polarizer 1 and the slow axis $\alpha 2$ of the retarder 2 is $\theta 1 = \alpha 2 - \alpha 1$ =approximately 15 degrees, and the slow axis $\alpha 2$ of the retarder 2 and the slow axis $\alpha 3$ of the retarder 3 is $\alpha 3 - \alpha 2 = \theta 1 + 45$ degrees= approximately 60 degrees.

When $\theta 2$ is 65 degrees, which is, the angle between the transmission axis $\alpha 4$ of the polarizer 4 and the slow axis $\alpha 5$ of the retarder 5 is $\theta 2 = \alpha 5 - \alpha 4 = 65$ degrees, and the angle between the slow axis $\alpha 5$ of the retarder 5 and the slow axis $\alpha 6$ of the retarder 6 is $\alpha 6 - \alpha 5 = \theta 2 + 45$ degrees=110 degrees, the ratio is close to 1 and there is no difference in image appearance seen from right and left. The graph in FIG. 17 indicates that if $\theta 2$ is in the range of 63 to 70 degrees, the difference in transmissivity when seen from the left and the right is within 20% (within 10% in right and left averages), the asymmetry is not significant. Therefore, $\theta 2$ is preferably 63 to 70 degrees.

The above result does not change when the angle between the transmissive axis $\alpha 1$ of the polarizer 1 and the slow axis $\alpha 2$ of the retarder 2 is $\alpha 1 - \alpha 2$=approximately 105 degrees, and the slow axis $\alpha 2$ of the retarder 2 and the slow axis $\alpha 3$ of the retarder 3 is $\alpha 2 - \alpha 3$=approximately 60 degrees since the transparent polarization status of the circular polarizer 11 hardly changes.

When the angle between the transmission axis $\alpha 1$ of the polarizer 1 and the slow axis $\alpha 2$ of the retarder 2 is $\alpha 1 - \alpha 2$=approximately 15 degrees, and the slow axis $\alpha 2$ of the retarder 2 and the slow axis $\alpha 3$ of the retarder 3 is $\alpha 2 - \alpha 3$=approximately 60 degrees, or $\alpha 2 - \alpha 1$= approximately 105 degrees and $\alpha 3 - \alpha 2$=approximately 60 degrees, the angle between the transmission axis $\alpha 4$ of the polarizer 4 and the slow axis $\alpha 5$ of the retarder 5 should be $\alpha 4 - \alpha 5$=approximately 65 degrees, and the slow axis $\alpha 5$ of the retarder 5 and the slow axis $\alpha 6$ of the retarder 6 should be $\alpha 5 - \alpha 6$=approximately 110 degrees.

First Embodiment

Figure 1:
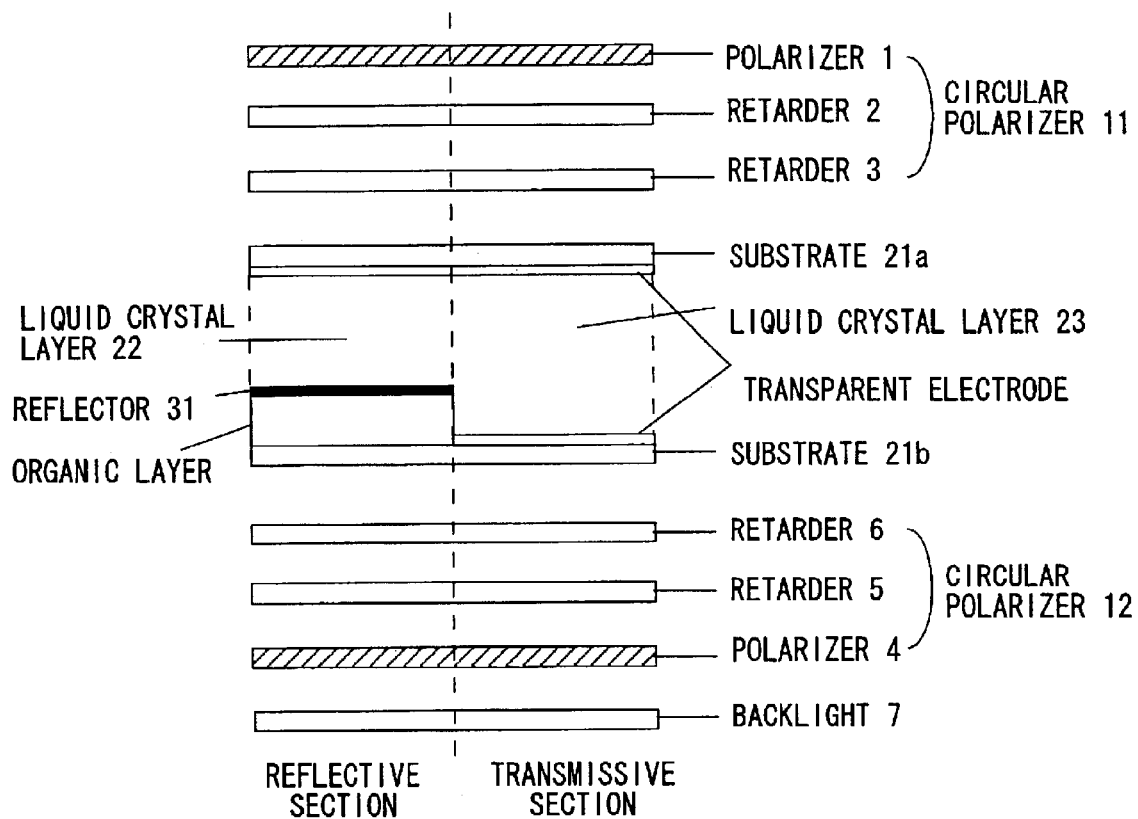
FIG. 1 is a view schematically showing a normal structure of a transflective liquid crystal display device.
Figure 2:
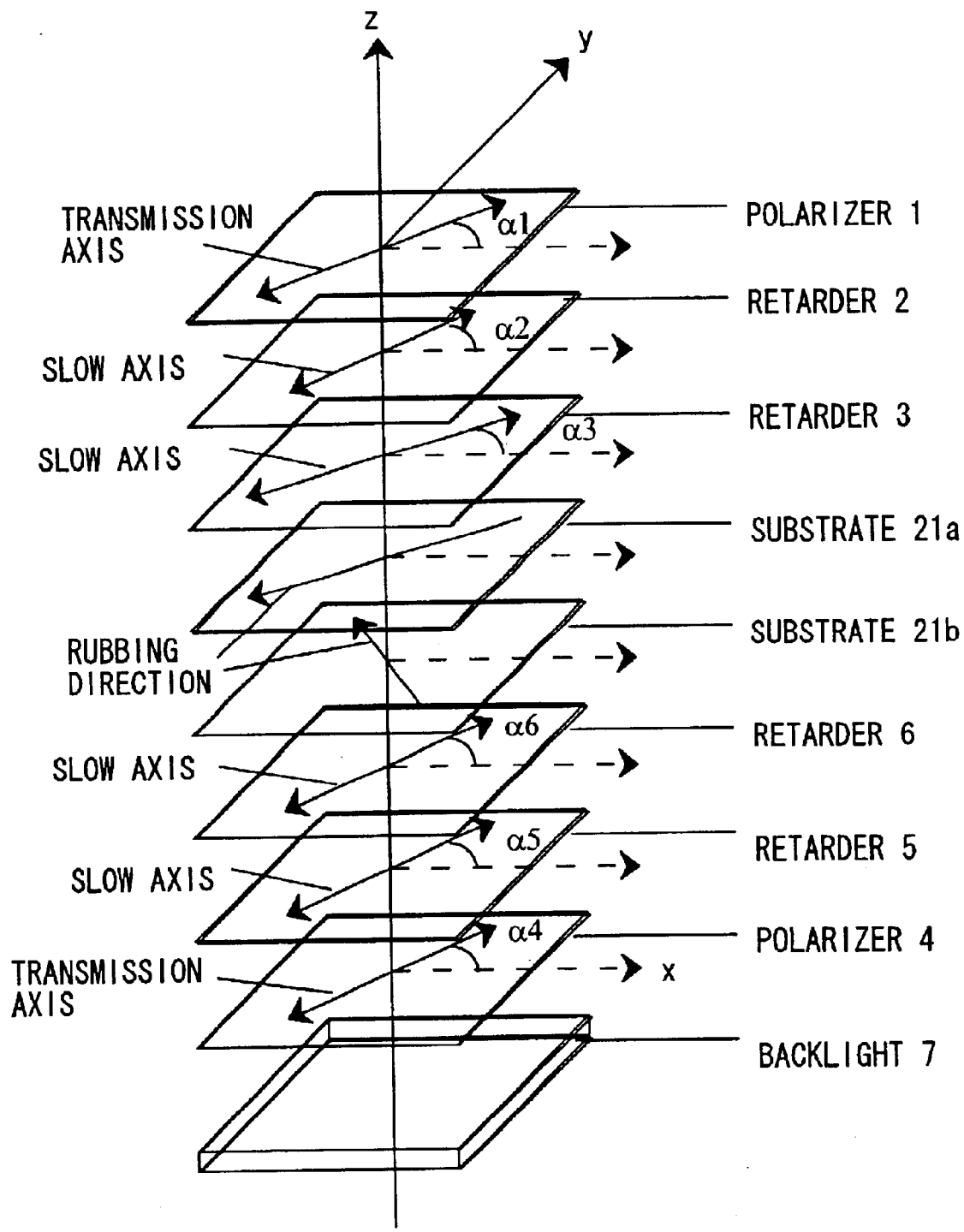
FIG. 2 is a view schematically showing a coordinate system of a transflective liquid crystal display device.
Figure 3:
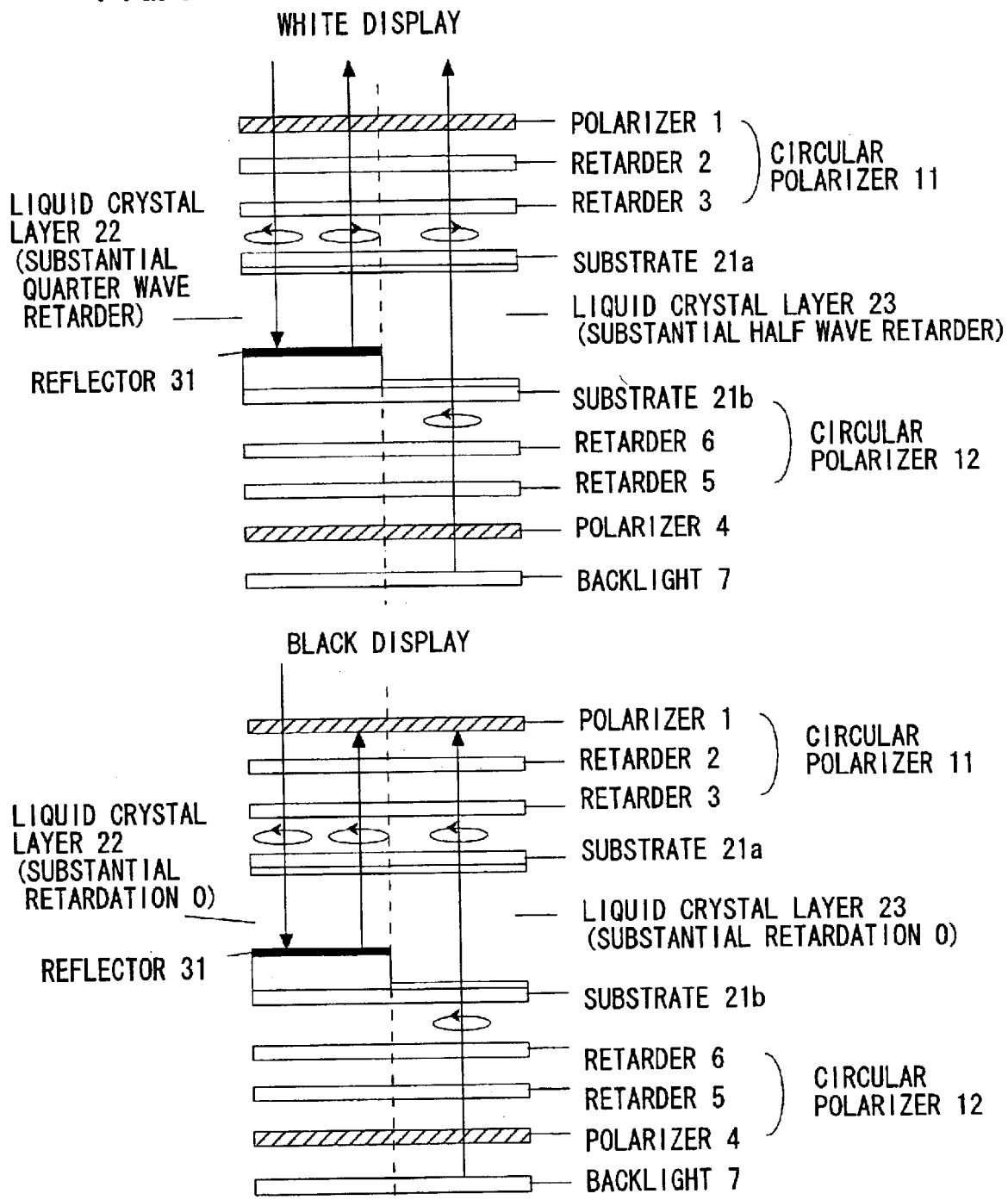
FIG. 3 is a view to explain display principle of a transflective liquid crystal display device using a circular polarizer.
Figure 4:
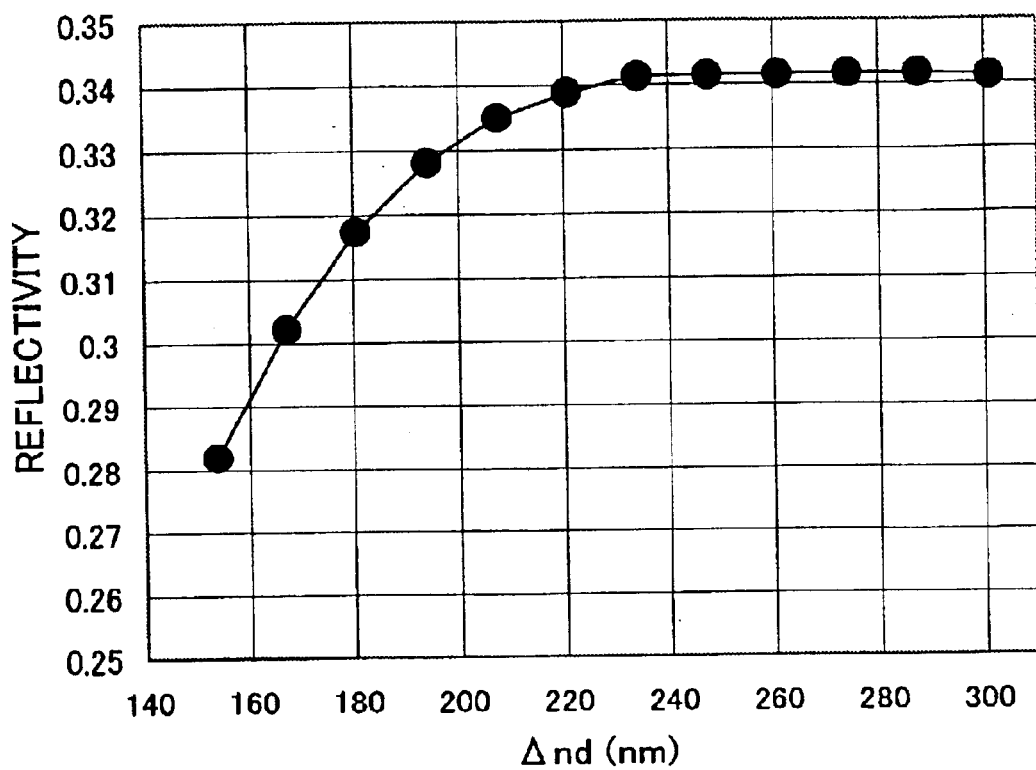
FIG. 4 is a view showing an evaluation result of a dependence of reflectivity in a white display in a reflective section on AΔd of a liquid crystal layer.

Table 2 shows a configuration example of a transflective liquid crystal display device according to the present invention. The symbols referring angles in Table 2 are shown in FIG. 2. $\Delta$nd of the liquid crystal layer 22 in the reflective section is 167 nm, $\Delta$nd of the liquid crystal layer 23 in the transmissive section is 288 nm, a twist angle is −70 degrees, and a rubbing direction at the side of the transparent substrate 21a is 235 degrees. The bisector of alignment directions of liquid crystal material at substrate interfaces is in the direction of 90 degrees.

TABLE 2

| Polarizer 1 | $\alpha 1$ = 22 degrees |
|---|---|
| Retarder 2 | $\alpha 2$ = 33 degrees, retardation 280 nm |
| Retarder 3 | $\alpha 3$ = 89 degrees, retardation 135 nm |
| Polarizer 4 | $\alpha 4$ = 100 degrees |
| Retarder 5 | $\alpha 5$ = 168 degrees, retardation 275 nm |
| Retarder 6 | $\alpha 6$ = 283 degrees, retardation 125 nm |

The optical properties of the reflective and transmissive sections in the transflective liquid crystal display device according to the configuration shown in Table 2 are as follows. The contrast of the reflective section is 167 and the color coordinates of a white display of the reflective section is (x, y)=(0.290, 0.314), achieving high contrast and real white display. The contrast of the transmissive section is 310, the color coordinates of a white display of the transmissive section is (x, y=(0.311, 0.309), and the transmissive ratio in a black display when a viewing axis is inclined at 40 degrees to the left and to the right with respect to normal (corresponding to FIG. 17) is 0.99, achieving high contrast, real white display, and symmetrical display.

The liquid crystal display elements corresponding to the reflective section and the transmissive section of the transflective liquid crystal display device having the above configuration are formed as follows. Liquid crystal molecules are aligned by a rubbing method, and Soluble Polyimides is used for an alignment film. A transparent electrode is formed using an ITO film, and a reflector is formed by adhering a scattering adhesive film (made by Nitto Denko Corporation) to an Al reflector, which is adhered to the substrate 21b. A substrate is a glass substrate. A wide-band circular polarizer is a product of Nitto Denko Corporation purchased for use. The wide-band polarizer has the retardation and direction shown in Table 2.

In the measurement of the reflective section, Xe lamp is used as a light source, and a luminance meter (BM-5A, Topcon Corporation) is used as a detector. In the measurement of the transmissive section, a backlight system for evaluation (Moritex Corporation) and a luminance meter (BM-5A, Topcon Corporation) are used respectively.

The measurement results in that the contrast of the liquid crystal display element corresponding to the reflective section is 75, and the color coordinates of a white display in the reflective section is (x, y)=(0.308, 0.320), achieving high contrast and real white display. The contrast of the liquid crystal display element corresponding to the transmissive section is 185, the color coordinates of a white display in the transmissive section is (x, y)=(0.307, 0.311), and the transmissive ratio in a black display when a viewing axis is inclined at 40 degrees to the left and to the right with respect to normal (corresponding to FIG. 17) is 0.90, achieving high contrast, real white display, and symmetrical display.

Second Embodiment

Table 3 shows another configuration example of a transflective liquid crystal display device according to the present invention. The symbols referring angles in Table 3 are shown in FIG. 2. $\Delta n \cdot d$ of the liquid crystal layer 22 in the reflective section is 174 nm, $\Delta n \cdot d$ of the liquid crystal layer 23 in the transmissive section is 294 nm, a twist angle is -66 degrees, and a rubbing direction at the side of the transparent substrate 21a is 240 degrees. The bisector of alignment directions of liquid crystal material at substrate interfaces is in the direction of 93 degrees. A hybrid alignment liquid crystal film (NHfilm, Nippon Oil Corporation) is used for the retarder 6.

TABLE 3

| Polarizer 1 | $\alpha 1 = 20$ degrees |
| --- | --- |
| Retarder 2 | $\alpha 2 = 36$ degrees, retardation 260 nm |
| Retarder 3 | $\alpha 3 = 96$ degrees, retardation 120 nm |
| Polarizer 4 | $\alpha 4 = 95$ degrees |
| Retarder 5 | $\alpha 5 = 161$ degrees, retardation 285 nm |
| Retarder 6 | $\alpha 6 = 272$ degrees, retardation 130 nm |

The liquid crystal display elements corresponding to the reflective section and the transmissive section of the transflective liquid crystal display device having the above configuration are formed. The production method and measurement method are the same as that used in the first embodiment.

The measurement results in that the contrast of the liquid crystal display element corresponding to the reflective section is 45, and the color coordinates of a white display in the reflective section is (x, y)=(0.306, 0.323), achieving high contrast and real white display. The contrast of the liquid crystal display element corresponding to the transmissive section is 122, the color coordinates of a white display in the transmissive section is (x, y)=(0.304, 0.312), and the transmissive ratio in a black display when a viewing axis is inclined at 40 degrees to the left and to the right with respect to normal (corresponding to FIG. 17) is 0.95, achieving high contrast, real white display, and symmetrical display.

As explained in the foregoing, the present invention provides a liquid crystal display device having a reflective liquid crystal display element presenting high quality images with high contrast and substantially white display.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device having a reflective liquid crystal display element, the reflective liquid crystal display element comprising:
   a set of substrates having an electrode to apply a voltage to a liquid crystal layer;
   a twisted liquid crystal layer interposed between the substrates;
   an elliptic polarizer consisting of a polarizer, a first retarder, and a second retarder having a slow axis substantially parallel to a bisector of alignment directions of liquid crystal material at substrate interfaces, and producing retardation of less than 140 nm; and
   a reflector reflecting light in a visible light range;
   wherein a product (nm) of birefringence $\Delta n$ of liquid crystal material used in the liquid crystal layer and a thickness d of the liquid crystal layer is not less than 120 nm, and not more than a value given by Formula 1:

Formula 1:
$$89.2 + \frac{1.42 \times 10^6}{[Re + (Re' - 270) \cdot \cos(2|\alpha_3 - \alpha_2|)]^2}$$

when a twist angle in the liquid crystal layer is in a range of 63 to 77 degrees, an angle between a transmission axis $\alpha 1$ of the polarizer and a slow axis $\alpha 2$ of the first retarder is in a range of 5 to 25 degrees or in a range of 95 to 115 degrees, an angle between the slow axis $\alpha 2$ of the first retarder and a slow axis $\alpha 3$ of the second retarder is in a range of 50 to 70 degrees, retardation produced by the second retarder is Re (nm), and retardation produced by the first retarder is Re' (nm).

2. A liquid crystal display device according to claim 1, wherein the twist angle in the liquid crystal layer is in a range of 65 to 75 degrees.

3. A liquid crystal display device according to claim 1, wherein the angle between the transmission axis $A1$ of the polarizer and the slow axis $\alpha 2$ of the first retarder is in a range of 10 to 20 degrees or in a range of 100 to 110 degrees.

4. A liquid crystal display device according to claim 2, wherein the angle between the transmission axis $\alpha 1$ of the polarizer and the slow axis $\alpha 2$ of the first retarder is in a range of 10 to 20 degrees or in a range of 100 to 110 degrees.

5. A liquid crystal display device according to claim 1, wherein the angle between the slow axis $\alpha 2$ of the first retarder and the slow axis $\alpha 3$ of the second retarder is in a range of 55 to 65 degrees.

6. A liquid crystal display device according to claim 2, wherein the angle between the slow axis $\alpha 2$ of the first retarder and the slow axis $\alpha 3$ of the second retarder is in a range of 55 to 65 degrees.

7. A liquid crystal display device according to claim 3, wherein the angle between the slow axis $\alpha 2$ of the first retarder and the slow axis $\alpha 3$ of the second retarder is in a range of 55 to 65 degrees.

8. A liquid crystal display device according to claim 1, wherein the product of birefringence $\Delta n$ of liquid crystal material used in the liquid crystal layer and the thickness d of the liquid crystal layer is not less than 130 nm.

9. A liquid crystal display device according to claim 2, wherein the product of birefringence Δn of liquid crystal material used in the liquid crystal layer and the thickness d of the liquid crystal layer is not less than 130 nm.

10. A liquid crystal display device according to claim 3, wherein the product of birefringence Δn of liquid crystal material used in the liquid crystal layer and the thickness d of the liquid crystal layer is not less than 130 nm.

11. A liquid crystal display device according to claim 5, wherein the product of birefringence Δn of liquid crystal material used in the liquid crystal layer and the thickness d of the liquid crystal layer is not less than 130 nm.

12. A liquid crystal display device according to claim 1, further having a transmissive liquid crystal display element, the transmissive liquid crystal display element comprising:
- a second elliptic polarizer consisting of a second polarizer, a third retarder, and a fourth retarder; and
- a second twisted liquid crystal layer interposed between the substrates,
- wherein a slow axis of the fourth retarder is inclined with respect to the bisector of alignment directions of liquid crystal material at substrate interfaces at −15 to +15 degrees, and the fourth retarder produces retardation of 80 nm to 140 nm.

13. A liquid crystal display device according to claim 12, wherein the slow axis of the fourth retarder is inclined with respect to the bisector of alignment directions of liquid crystal material at substrate interfaces at −10 to +10 degrees.

14. A liquid crystal display device according to claim 12, wherein an angle between a transmission axis of the second polarizer and a slow axis of the third retarder is in a range of 63 to 70 degrees or in a range of 153 to 160 degrees, and an angle between the slow axis of the third retarder and a slow axis of the fourth retarder is in a range of 108 to 115 degrees.

15. A liquid crystal display device according to claim 13, wherein an angle between a transmission axis of the second polarizer and a slow axis of the third retarder is in a range of 63 to 70 degrees or in a range of 153 to 160 degrees, and an angle between the slow axis of the third retarder and a slow axis of the fourth retarder is in a range of 108 to 115 degrees.

16. A liquid crystal display device according to claim 12, wherein the fourth retarder is a hybrid alignment liquid crystal film.

17. A liquid crystal display device according to claim 13, wherein the fourth retarder is a hybrid alignment liquid crystal film.

18. A liquid crystal display device according to claim 14, wherein the fourth retarder is a hybrid alignment liquid crystal film.

* * * * *